United States Patent [19]
Campbell

[11] Patent Number: 5,349,605
[45] Date of Patent: Sep. 20, 1994

[54] DC ARC TORCH POWER SUPPLY

[75] Inventor: Brian Campbell, Sydney, Australia

[73] Assignee: The University of Sydney, Sydney, Australia

[21] Appl. No.: 952,901

[22] PCT Filed: Jun. 13, 1991

[86] PCT No.: PCT/AU91/00251

§ 371 Date: Nov. 20, 1992

§ 102(e) Date: Nov. 20, 1992

[87] PCT Pub. No.: WO91/20176

PCT Pub. Date: Dec. 26, 1991

[30] Foreign Application Priority Data

Jun. 15, 1990 [AU] Australia .............................. PK 0662

[51] Int. Cl.$^5$ ............................................. H05B 7/00
[52] U.S. Cl. .................. 373/25; 219/121.11; 219/121.54
[58] Field of Search ............... 373/25, 22, 12, 49, 373/70; 219/121.34, 122, 121.57, 121.54, 121.39, 130.1, 130.4, 124.22, 121 PV, 121.11; 321/10; 361/159

[56] References Cited

U.S. PATENT DOCUMENTS

| | | | |
|---|---|---|---|
| 3,577,030 | 4/1971 | Cusick | 315/111 |
| 3,835,368 | 9/1974 | Williams | 323/7 |
| 3,868,561 | 2/1975 | Matthes | 321/10 |
| 4,009,365 | 2/1977 | Kalev | 219/135 |
| 4,225,769 | 9/1980 | Wilkins | 219/130.4 |
| 4,249,061 | 2/1981 | Puschner | 219/124.22 |
| 4,322,709 | 3/1982 | Vonder | 338/32 H |
| 4,324,971 | 4/1982 | Frappier | 219/121 PV |
| 4,910,635 | 3/1990 | Gilliland | 361/159 |
| 4,943,699 | 7/1990 | Thommes | 219/121.57 |
| 5,086,205 | 2/1992 | Thommes | 219/121.54 |
| 5,166,871 | 11/1992 | Carroll et al. | 363/56 |

FOREIGN PATENT DOCUMENTS

| | | |
|---|---|---|
| 58-084415 | 5/1983 | Japan . |
| 1368128 | 1/1988 | U.S.S.R. . |
| 1272178 | 4/1972 | United Kingdom . |
| 1329438 | 9/1973 | United Kingdom . |
| 1437107 | 5/1976 | United Kingdom . |
| 1468198 | 3/1977 | United Kingdom . |
| 2019135 | 10/1979 | United Kingdom . |

Primary Examiner—Bruce A. Reynolds
Assistant Examiner—Tu Hoang
Attorney, Agent, or Firm—Townsend & Townsend Khourie & Crew

[57] ABSTRACT

A DC power supply for producing plasma for a DC arc torch. The DC power supply includes a controlled switch for coupling and decoupling a direct current source from the DC arc torch. The DC power supply also includes an inductance for supplying current to the DC arc torch when the direct current source is decoupled from the DC arc torch. A freewheeling diode is used to provide a current path from the inductance to the DC arc torch. A switch driver drives the coupling and decoupling of the controlled switch at a particular frequency and at a variable duty cycle. A feedback circuit varies a variable duty cycle of the switch driver in response to the amount of current detected flowing to the DC arc torch.

5 Claims, 2 Drawing Sheets

DC ARC TORCH POWER SUPPLY

TECHNICAL FIELD

This invention concerns a direct current (dc) arc torch power supply. dc arc torches employ an electrical discharge arc to heat a working gas and generate a plasma which is then passed through a nozzle comprising the hollow anode of the torch. The plasma may be used to ignite combustible fuel, such as pulverized coal, in a steam raising boiler generating electrical power. The plasma may also be used to warm the combustion chamber prior to ignition, and to ensure stable combustion of the fuel.

Such an arc torch may require a voltage in the range of 0 to 1,000 volts and a current range of from 100 to 300 Amps, that is electrical power in the range from 0 kW to 300 kW.

BACKGROUND ART

One of the particular problems that arises, in generating an electrical discharge arc in a dc arc torch, is that the arc has a large voltage drop from anode to cathode with high levels of voltage fluctuations. The arc will also, normally, have an inverse voltage-current relation and as current rises the voltage drop across the arc will fall. As a result, it is necessary for the power supply to react to a fall in voltage by limiting the arc current.

A known power supply employs a thyristor, or a silicon controlled rectifier (SCR), in each phase of an alternating current mains supply. At least two of the thyristors are ON at any given time, and conducting current to an inductance which stores energy and smooths the output. The thyristors are sequentially turned ON, to control the average current flow, by means of a predictive control circuit, which attempts to predict the current demand over the following cycle. The thyristors are turned OFF by the next current zero to arrive.

This supply has a number of disadvantages. The first is that control is only exercised over the current at the times when the thyristors are being turned ON. This implies an average delay in the current control of a third of a period of the supply (when a thyristor is used in each phase of a third phase supply). It follows there is a maximum rate at which current can be controlled. As a result the inductance must be large enough to limit current ripple at higher rates. This is essential because current zeros extinguish the arc, and high current peaks lead to electrode degradation. This adds greatly to the expense of the power supply.

A second disadvantage arises from the fact that the switching control is predictive, and results from a calculated guess rather than being absolutely determined from the current actually flowing at any given time.

SUMMARY OF THE INVENTION

According to the present invention there is provided a dc power supply for a dc arc torch comprising:

a controlled switch and an inductance connected in series, in use, in circuit with a source of direct current and an arc torch;

a free-wheeling diode connected, in use, to be reverse biased when the switch is ON, and forward biased when the switch is OFF to maintain current flow through the arc and the inductance;

a switch driver to cycle the switch ON and OFF; and a feedback circuit having a current sensor associated with the circuit and connected to the switch driver to control the duty ratio of the switch in accordance with the current flowing through the arc.

This circuit uses a direct current input and controls it to provide the required current to the arc. It has the advantage that the current produced is independent of the arc voltage waveform, and it is determined by a feedback circuit operating in real time, rather than a predictive controller; this makes the control more accurate and sensitive. Furthermore, current ripple can be reduced from that of a given conventional supplies by operating the switch at higher frequencies than those readily available from a 50 Hz supply. A reduction in the size of inductance can also be achieved if higher operating frequencies are used.

A further advantage of using rectified dc is that it is possible to maintain the voltage level even while supplying high current, and several torches can be run from a single source of direct current. Where several dc power supplies embodying the invention are used it is possible to minimise harmonics being reflected back into the source by controlling their relative switching times, say using microprocessor control.

In one embodiment the switch driver includes a monostable multivibrator fed by signals from a clock signal generator, and the switch is turned ON and OFF during every period of the clock signal. The feedback circuit is arranged to shorten the duty ratio of the monostable if the magnitude of the current flowing through the arc increases.

The current sensor is preferably a Hall-effect device which has the advantage over an inductive sensor that it produces a signal carrying both AC and dc information about the current.

The inductance is preferably an air-gap choke; in which the air-gap linearizes the inductance of the choke.

BRIEF DESCRIPTION OF THE DRAWINGS

The invention will now be described by way of example only, with reference to the accompanying drawings, in which.

BEST MODE FOR CARRYING OUT THE INVENTION

Figure 1:
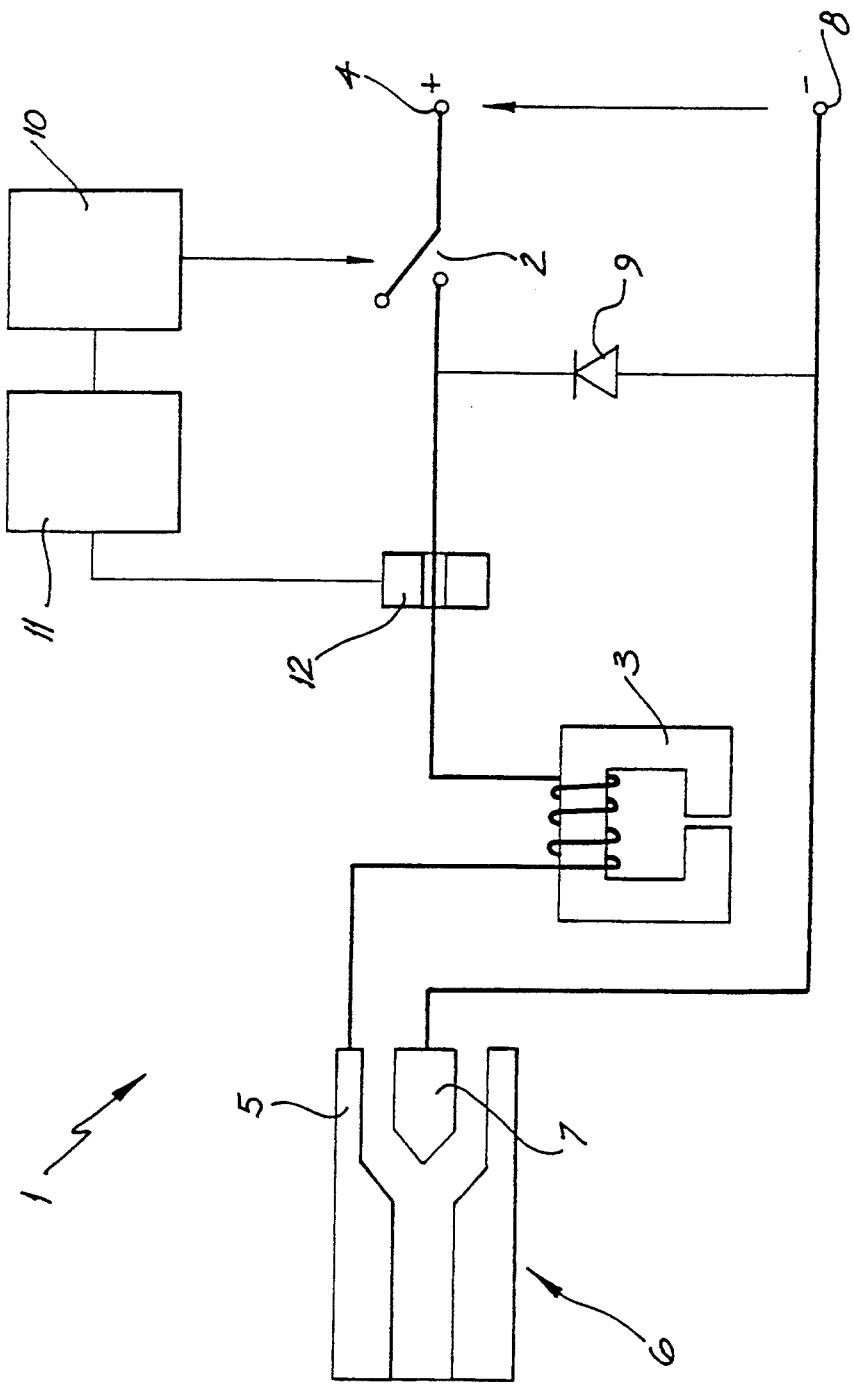
FIG. 1 is a schematic circuit diagram of power supply for an arc torch embodying the present invention.

Referring now to FIG. 1, power supply 1 comprises a switch 2 and an air-gap choke (inductance) 3 connected in series between the positive terminal 4 of a direct current (dc) supply, and the anode 5 of an arc torch 6. Cathode 7 of arc torch 6 is connected to the negative terminal 8 of the dc supply. A free wheeling diode 9 is connected from between switch 2 and inductance 3 back to the negative terminal 8 of the supply. A switch driving circuit 10 turns the switch ON and OFF, and a feedback circuit 11, including a hall-effect current sensing device 12 associated with the current path flowing through inductance 3 and arc torch 6, is provided to control the signal provided by switch driver 10.

The dc supply will typically be derived from a three-phase alternating mains supply by conventional rectification and smoothing.

The effect of switch 2 being turned ON and OFF is to step down the average value of the dc supply. When switch 2 is ON, current flows from the supply through the inductance 3 and arc torch 6. When switch 2 is OFF, current continues to flow through inductance 3 and arc torch 6 but is drawn through free-wheeling diode 9. In effect energy stored by inductance 3 when switch 2 is ON is used to maintain current flow through the arc when switch 2 is OFF. The energy stored in the inductance being gradually dissipated in the total resistance made up of the arc, the resistance of the inductance and the forward resistance of the free-wheel diode; with the arc resistance dominating.

In a first embodiment switch 2 comprises a series of power MOSFETs connected in parallel. They have been found to operate well when arranged in parallel with a 20% current derating penalty. The MOSFETs, together with several free-wheeling diodes, may be arranged in a low inductance conductor in either a water cooled or an air cooled configuration.

Figure 2:
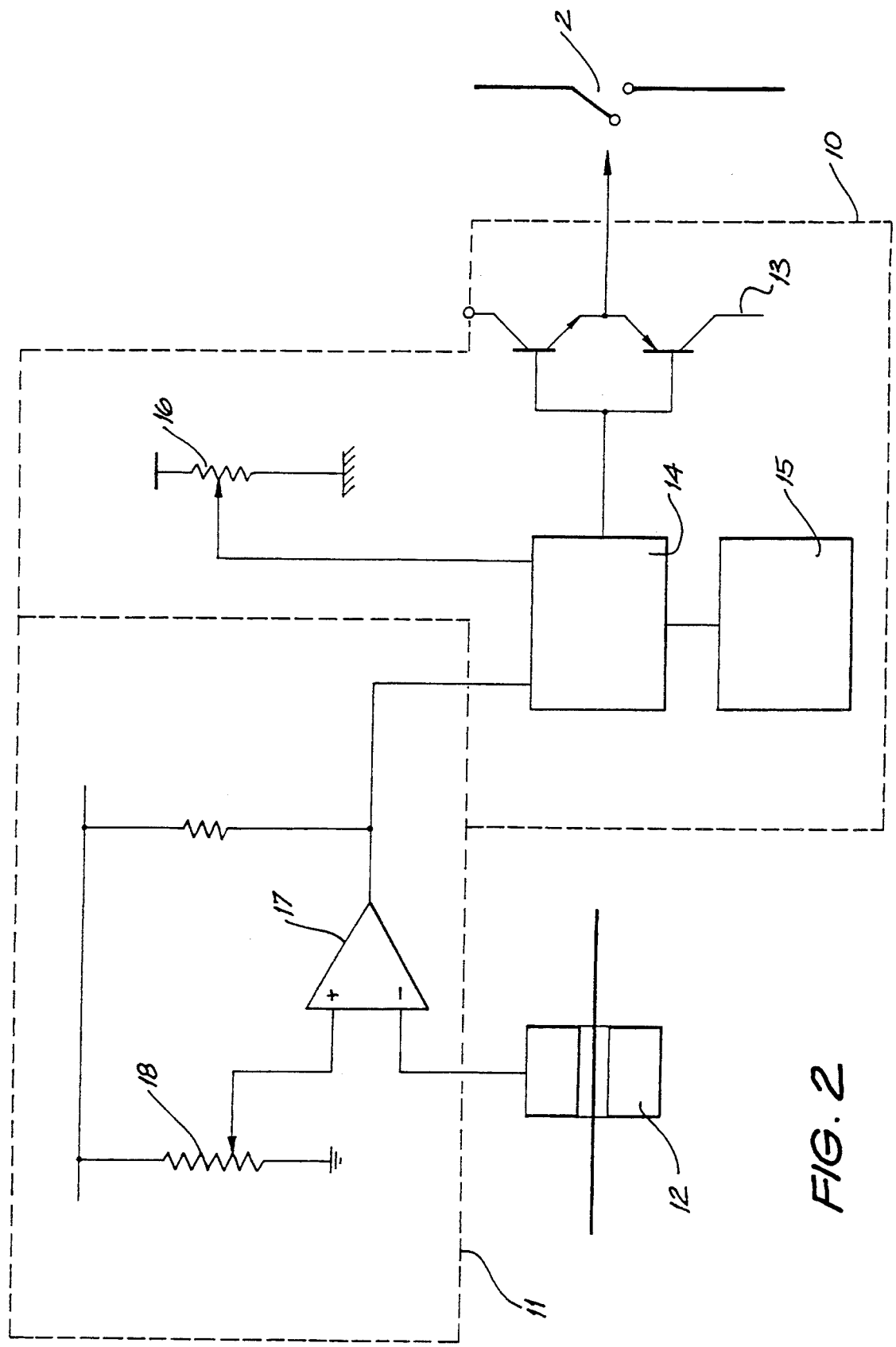
FIG. 2 is a schematic circuit diagram of a switch driver and feedback circuit in accordance with an embodiment of the present invention.

Referring now to FIG. 2, the switch driving circuit 10 and feedback circuit 11 of this embodiment are described in greater detail. Switch driving circuit 10 comprises a pair of transistors 13 arranged in push-pull relation with their common base connected to a monostable multivibrator 14. Monostable multivibrator 14 is fed by a signal of say 2 KHz from a clock signal generator 15 and the on-time is controlled by a potentiometer 16 whose value is selected to turn the monostable OFF within the duty cycle range of 5% to 95%.

The feedback circuit 11 comprises a comparator 17 receiving a first input from a potentiometer 18 and a second input, at its inverting terminal, from the current sensor 12. Current sensor 12 outputs a voltage waveform related to the current carried in the conductor passing through its body. The voltage waveform carries both dc and ac information about the current.

Comparator 17 produces an output which disables monostable 14 when the waveform produced by current sensor 12 exceeds the voltage set on potentiometer 18. This causes the driving transistors 13 to open switch 2. Switch 2 remains open until the start of the next cycle. If the arc resistance increases, the signal produced by sensor 12 will take longer to reach reference voltage and the duty cycle will be longer so that switch 2 remains closed for longer. Variation in the duty cycle of the driving circuit can be thought of as control of average current through switch 2.

Although the invention has been described with reference to particular embodiments, it should be appreciated that it could be embodied in many other ways. For instance, instead of using MOSFETs, or a power transistor, one or more gate turnoff thyristor (GTO) could be employed. Of course, suitable snubber protection around the switching device should be included as desired.

I claim:

1. A DC power supply having a source of direct current, for a DC arc torch, comprising:
   a controlled switch coupled between the source of direct current and the DC arc torch, for electrically communicating the source of direct current to the DC arc torch when switched ON and for decoupling the source of direct current from the DC arc torch when switched OFF;
   an inductance, coupled between said controlled switch, and the DC arc torch, for providing a current flow to the DC arc torch in response to said controlled switch being switched OFF;
   a free-wheeling diode, coupled to the DC arc torch and to said inductance, said free-wheeling diode being reverse biased when said controlled switch is switched ON, and said free-wheeling diode being forward biased when said controlled switch is switched OFF, said free-wheeling diode for maintaining said current flow through the DC arc torch and said inductance in response to said controlled switch being switched OFF;
   a switch driver, coupled to said controlled switch, for switching said controlled switch ON and OFF at a variable duty cycle; and
   a feedback circuit, having a current sensor, coupled to the DC arc torch and to said switch driver for controlling said variable duty cycle of said controlled switch in response to a current flowing through the DC arc torch.

2. A DC power supply according to claim 1 wherein said switch driver further comprises:
   a clock generator for producing a clock signal; and
   a monostable multivibrator, coupled to said clock signal generator, to said controlled switch, and to said feedback circuit for operating said controlled switch at a nominal duty cycle in response to said clock signal during every period of said clock signal, and for varying said nominal duty cycle in response to a feedback signal from said feedback circuit to produce said variable duty cycle.

3. A DC power supply according to claim 1, wherein said current sensor is a Hall-effect device.

4. A DC power supply according to claim 1, wherein said inductance is an air gap choke.

5. A DC power supply according to claim 2, wherein said nominal duty cycle is from 5% to 95%.

* * * * *

UNITED STATES PATENT AND TRADEMARK OFFICE
CERTIFICATE OF CORRECTION

PATENT NO. : 5,349,605
DATED : September 20, 1994
INVENTOR(S) : Brian Campbell

It is certified that error appears in the above-indentified patent and that said Letters Patent is hereby corrected as shown below:

On the Title Page, item [73], add the following information:
--The Electricity Commission of New South Wales
  Sydney, Australia--

Signed and Sealed this

Twenty-first Day of March, 1995

Attest:

BRUCE LEHMAN

Attesting Officer    Commissioner of Patents and Trademarks